Figures 1, 2:
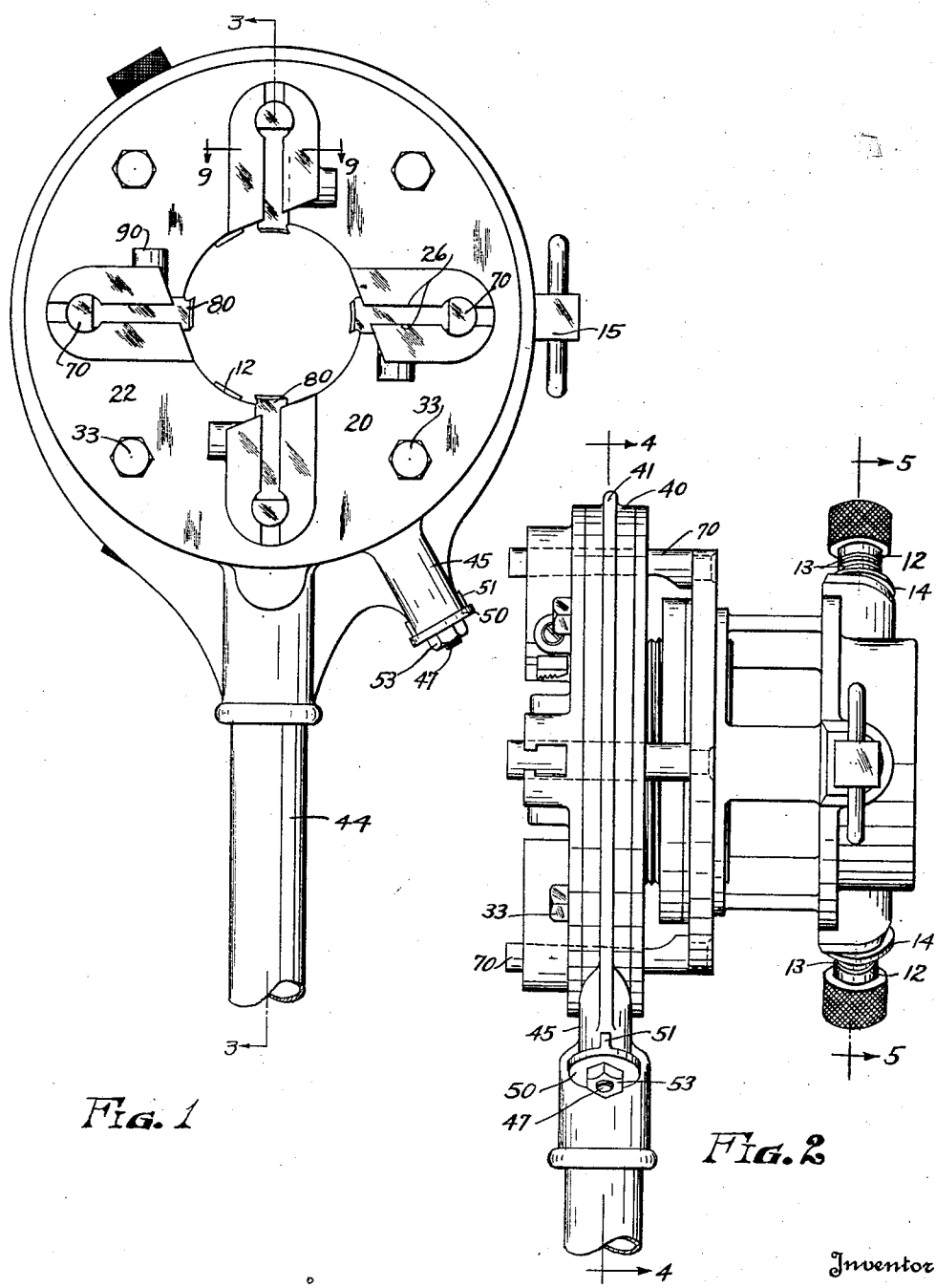

June 2, 1931. I. W. NONNEMAN 1,808,315
DIESTOCK
Filed Jan. 13, 1930  3 Sheets-Sheet 1

Inventor
Ira W. Nonneman,
By Bates, Golrick & Teare,
Attorneys

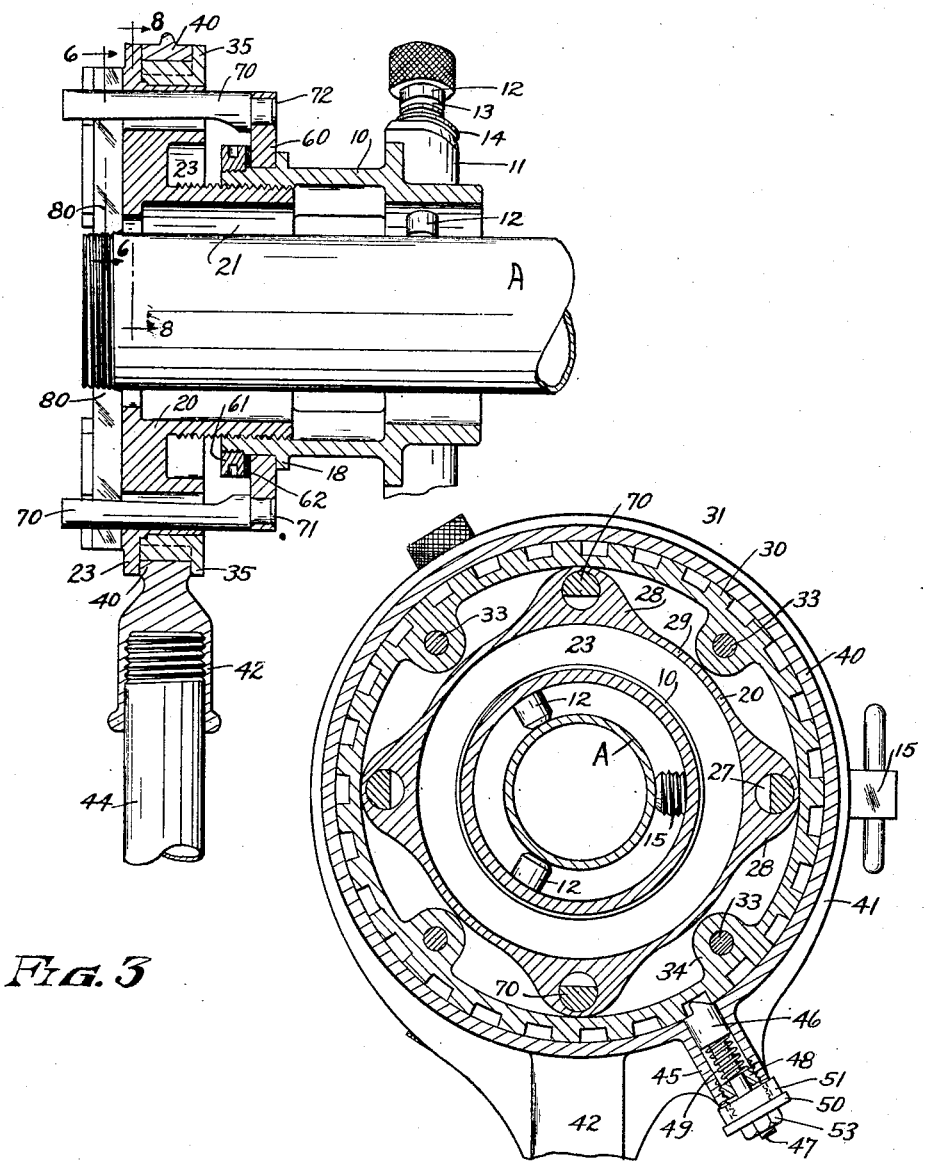

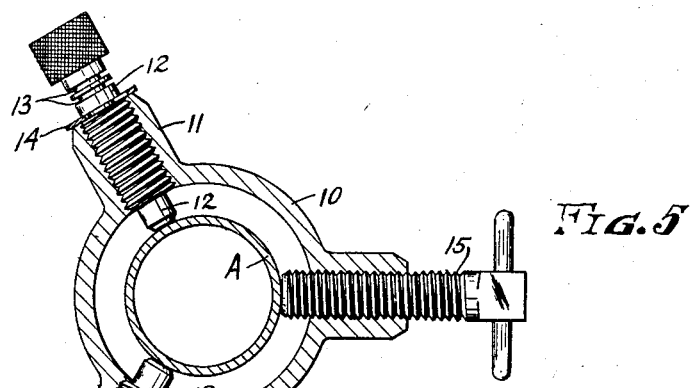
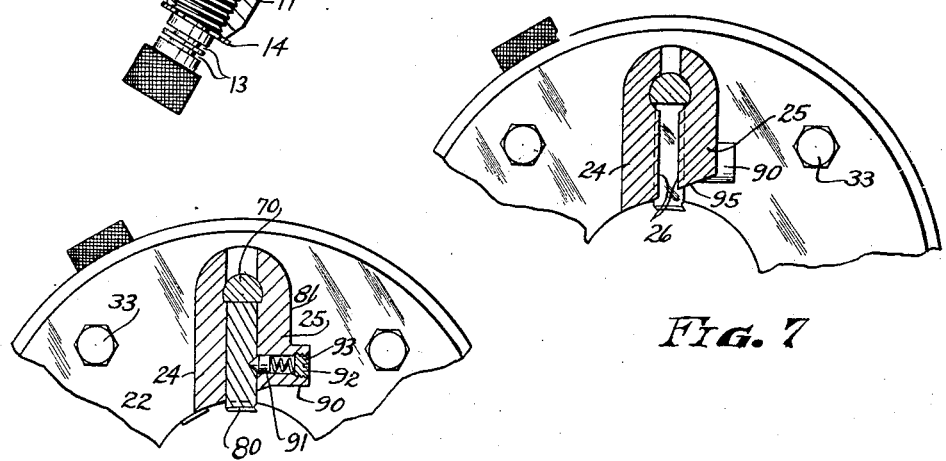
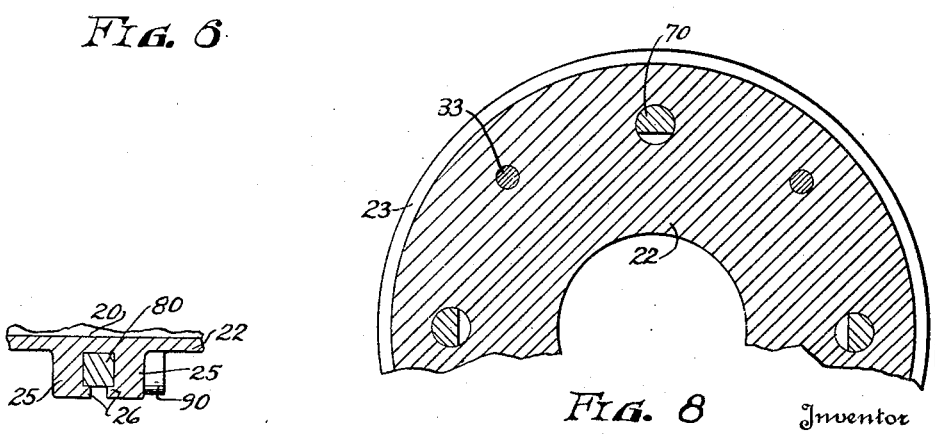

Patented June 2, 1931

1,808,315

UNITED STATES PATENT OFFICE

IRA W. NONNEMAN, OF WARREN, OHIO, ASSIGNOR TO THE BORDEN COMPANY, OF WARREN, OHIO, A CORPORATION OF OHIO

DIESTOCK

Application filed January 13, 1930. Serial No. 420,362.

This invention relates to a receding distock of the type having tapered pins forming abutments for individual chasers, which are carried by a rotating frame which moves longitudinally of the pins, the chasers gradually moving outwardly as they travel along the pins.

An object of the invention is to adapt such a die stock for convenient operation by a ratchet, which avoids the bulkiness of the old two handle frame, allows operation in confined spaces, and provides a large amount of power for cutting operation. A further object of the invention is to so devise such ratchet driven die stock that the tool shall be very compact and thus of a very comparatively small size measured either transversely and longitudinally. This small size is accompanied by lightness in weight without sacrificing strength. This compactness and lightness is a decided advantage in the tool of this character, which is frequently carried by hand from place to place.

As the chasers, positioned by surfaces which gradually depart from the axis of rotation, are forced outwardly by the cutting pressure to cut the desired tapered thread, the outward thrust of the chasers subjects the abutment pins to severe stresses. It is one of the objects of the present invention to provide a die stock in which the pin is effectively braced to resist such outward stress and prevent bending or other distortion to the pins.

Another object of the invention is to provide for the rapid and economical manufacture of the die stock by so devising it that the chaser housings may be machined by modern tools with great rapidity, producing accurate chaser cavities and without interfering with the desired bracing of the control ling pins.

The invention is illustrated in the drawings hereof, and is hereinafter more fully described and the essential novel features summarized in the claims.

In the drawings Fig. 1 is a face view of a die stock embodying my invention; Fig. 2 is an edge view of the same; Fig. 3 is an axial section as indicated by the line 3—3 on Fig. 1; Fig. 4 is a transverse section, parallel with Fig. 1, substantially in a plane indicated by the line 4—4 on Fig. 2; Fig. 5 is a transverse section through the clamp or work holder as indicated by the line 5—5 on Fig. 2; Figs. 6, 7 and 8 are fragmentary radial sections through the chaser-carrying frame and in different planes parallel with Fig. 1 and indicated respectively by the line 6, 7 and 8 on Fig. 3; Fig. 9 is a fragmetary transverse section through one of the chaser housings, as indicated by the line 9—9 on Figs. 1 and 7.

In Fig. 3 of the drawings, A indicates a pipe being threaded. Surrounding this pipe and clamped to it is a tubular frame 10, commonly called a work holder. This frame has radial internally threaded bosses 11 in which are mounted abutment screws. I have shown two screws 12, 120° apart, adapted to be accurately positioned for different sizes of pipe, and a third screw 15, 120° from the other two, which operates as a clamping screw. The screws 12 are shown as provided with a series of grooves 13 corresponding to different sizes of pipe. A loose washer 14, having a hole as large as the annular ribs on the screw between the grooves, may occupy any one of the grooves or abut the screw head, and thus form a positioning abutment enabling the screw to be readily set in position for certain definite sizes of the pipe, for instance, as illustrated, the die stock may be set for 1″, 1¼″, 1½″ or 2″ pipes. This construction however, constitutes no part of the present invention.

Threaded internally into the work holder sleeve 10 is a sleeve 21 of the rotary chaser carrying frame 20. This frame is made of a single integral casting and comprises primarily the following parts, namely, the externally threaded sleeve 21, a disk-like radial head 22 of considerable thickness but cored out on its inner face around the threads 21 as shown at 23, and chaser housings on the outer face of the head, comprising pairs of ribs 24, 25 with inwardly overhanging top flanges 26.

Surrounding the chaser frame and rigidly bolted to it is a ring 30 having outwardly facing radial teeth 31. This ring is held in place on the chaser frame by cap screws 33 which pass through the face plate 22 and thread into bosses 34 formed on the inner side of the ring. The ring 30 is L-shaped in cross-section, that is to say, it has at its inner face a flange 35. There is thus left between this flange and the extreme edge of the face plate 22 an annular channel which is occupied by the ring-like portion of the handle frame. This ring-like portion or strap, designated 40, is held in place by the flange 35 when the ring 30 is bolted to the face plate of the head but is freely rotatable in such channel. The strap 40 is stiffened by an outward web 41 and has a radially projecting internally threaded boss 42 in which is removably seated an operating handle 44.

The driving ring 40 also has a radial boss 45 which is occupied by a radially movable ratchet-nosed pawl 46 adapted to coact with the teeth of the ring 30. This pawl is shown as having the shank 47 extending freely through a plug 48 in the boss. A helical spring 49 surrounding the shank and compressed between the head 46 and the plug 48 forces the pawl inwardly. The pawl may be pulled outwardly by the head 50 on the shank 47 to free it from the ratchet ring 30; it may be turned by the head into the opposite position from that shown in Fig. 4, whereby the handle may feed the ring and chaser frame in the opposite direction.

The pawl shank 47 slides freely through the head 50, the inward movement being limited by a nut 53 on the shank. The head is provided with a diametric rib 51 on its inner face, which normally occupies a corresponding notch in the boss 45 and prevents displacement of the pawl. An outward pull on the head frees the rib from the notch. If the head is then turned less than one-half a turn the rib, riding on the end of the boss, holds the pawl in idle position free from the notched wheel. On the other hand, a turn of 180° allows the pawl to seat facing in the opposite direction.

Mounted on the work holder sleeve 10 is a rotatable ring 60, shown as resting against a flange 18 on the work holder and retained in place by a nut 61 screwing onto the work holder, there being preferably a felt washer 62 between the nut and ring. This maintains the ring freely rotatable on the stationary sleeve 10. Equidistantly mounted on the ring 60 are the taper pins 70, four being shown. Each pin has a shank 71 snugly occupying an opening in the ring, the end of the pin being riveted as at 72 to insure rigid engagement. The pin has considerable of a shoulder bearing against the inner face of the ring, and this, with the riveted end, holds the pin rigidly in place on a ring. The pin is made from cylindrical stock cut off longitudinally on a plane inclined outwardly toward the shank of the pin, as clearly shown in Fig. 3.

Each pin 70 occupies a drilled cylindrical hole 27 in the head 22 of the handle frame 20. These holes are made in outward bosses 28 of the general contour of the handle frame as shown in Fig. 4. The outermost portion of these bosses is substantially tangent to the inner periphery of the feeding ring 30. Between these bosses 28, the handle frame is materially reduced in thickness as at 29, to allow space for the inward bosses 34 of the feeding ring. The outward bosses of the handle frame and the inward bosses of the feeding ring are alternately positioned as shown in Fig. 4, which gives compactness of construction, as well as lightness of material where the material is not needed.

Each tapered pin 70 extends transversely through corresponding chaser housing. It will be noticed, particularly from Figs. 6 and 7, that the pin 70 is of materially larger diameter than the extreme width of the housing cavity, and, accordingly, the pin obtains bracing against outward movement, not only by the face-plate portion 22 of the chaser frame, but also to some extent by the ribs 25, and still more by the overhanging flanges 26. The pin therefore is not only thoroughly anchored at its inner end but is intermediately braced by the entire thickness of the chaser frame head (see Fig. 3) and also, directly at its active portion, by the chaser housing for its entire height. I have thus provided a substantial abutment for the chaser which will not be distorted in use, notwithstanding a very heavy outward thrust of the chaser.

The chasers are designated 80; they stand radially in the chaser frame housings and at their outer ends abut the flat faces of the tapered pins. The chasers are accordingly substantially rectangular in form, both longitudinally and transversely, and no notching is required, resulting in a strong chaser.

To prevent the chasers dropping out of place inwardly, I provide each chaser housing with a spring detent coacting with the chaser. Thus, on the wall 25 of each housing, I form an outward boss 90 and I bore a hole through the boss and housing wall. In this hole I mount a conical plug 91 pressed toward the housing cavity by a compression spring 92 bearing against a stationary plug 93 threaded into the boss. The chaser is provided on its side with a conical cavity 81 which the conical face of the plug 91 normally occupies. This cavity in the chaser is deep enough so that the recessional movement of the chaser simply cams the conical head back to some extent but not entirely free from the conical cavity. To remove the chaser inwardly however, it is only necessary that its inwardly projecting portion be suitably grasped and the chaser given a sudden inward movement to cam back the conical plug and thus free the chaser.

It will be noticed that the ends 95 of the housing walls 25 are cut away on a bevel to allow clearance for the cutting edge of the chaser, thus enabling ease of oiling and providing a suitable chip space.

By extending the rectangular chaser cavity clear through the housing, back of the pin 70 as well as the front thereof, I can insert the chasers from the outside whenever the chaser frame is rotated outwardly to nearly its extreme outward position, so that the pins 70 are withdrawn entirely from the housings. This enables the insertion of chasers if desired, longer than may be inserted from the inside, in case it is desired to cut a thread on a comparatively small pipe.

The continuously open chaser passageway also has material advantages in the machining of the cavity. After the chaser frame is cast, the cavities may be cut continuously through diametrically opposite chaser housings by a milling tool which cuts a groove of the width equal to the distance between the two flanges 26. After this is cut, a suitable broaching tool may widen the cavity beneath the flange portion to provide the rectangular space illustrated in Fig. 9. By having the opening extend clear through the housing, a number of these frames may be mounted in succession on a jig and the milling and broaching accomplished by a single operation. The cylindrical hole for the tapered pins may be drilled either before or after the milling and broaching, and, if desired, at the same time with the holes for the cap screws 33.

Referring to the advantages of compactness and lightness of this tool, it should be noticed that the annular cavity 23 on the inner face of the chaser frame head allows the chaser frame to pass beyond the nut 61 of the work-holder and clear inwardly to the tapered-pin-ring 60. The alternate arrangement of the outward bosses 28 for the tapered pins and the inward boss 34 for the toothed feed ring reduces the overall diameter of the tool. By making the feed ring with a flange, the handle frame strap is secured rotatably in place by the same cap screws that hold the feed ring. The method of machining allowed by the form of the chaser housings enables them to be made accurately and quickly. By making the tapered pins of considerably greater diameter than the thickness of the chasers, I obtain an abutment for the pin not only by the head of the chaser frame, but by the housing walls themselves, thus increasing the stability of the tool.

I claim:—

1. In a die stock, the combination of a chaser-carrying-frame, chasers carried thereby, a set of pins occupying openings in the chaser frame and forming abutments for the chasers, the chaser frame having outward bosses occupied by said pins, a ring having outwardly facing teeth surrounding the set of outward bosses, said ring having inward bosses respectively positioned between proximate outward bosses, means for clamping the inward bosses of the ring to the chaser carrying frame, and a handle frame having a pawl coacting with the teeth of the toothed ring.

2. In a die stock, the combination of a threaded sleeve adapted to be clamped to the work, a chaser frame having a head and a threaded sleeve meshing with the clamped sleeve, said head having chaser housings, chasers occupying said housings, a ring rotatably mounted on the clamped sleeve, tapered pins carried thereby extending across the head of the chaser frame and the housings to engage the chasers, the head of the chaser frame having outward bosses embracing the pins, an externally toothed ring surrounding the chaser frame and having inward bosses alternately arranged with respect to the outward bosses, bolts occupying said inward bosses and rigidly clamping the ring to the head of the chaser frame, and a handle frame carrying a pawl coacting with said teeth.

3. In a die stock, the combination of a chaser carrying frame, chasers carried thereby, a set of tapered pins occupying openings in the chased frame and forming abutments for the chasers, the chaser frame head having outward bosses occupied by said pins and an annular edge portion projecting beyond the bosses, a ring having outwardly facing teeth surrounding the set of outward bosses, said ring having inward bosses respectively positioned between proximate outward bosses, said ring having an outward flange at the edge opposite the overhang of the head, bolts occupying the inward bosses of the ring and the chaser frame head for clamping them together, a handle frame having a strap surrounding said teeth between the head-overhang and the ring flange, and a pawl carried by the handle frame and coacting with the teeth of the toothed ring.

In testimony whereof, I hereunto affix my signature.

IRA W. NONNEMAN.